7 Sheets—Sheet 1.

J. E. WEAVER & W. S. COLWELL.
PROCESS AND APPARATUS FOR MANUFACTURING SALT OR SUGAR.

No. 170,791. Patented Dec. 7, 1875.

Witnesses
James J. Johnston
Joseph F. Hewitt

Inventors
Jas. E. Weaver
W. S. Colwell

7 Sheets—Sheet 2.

J. E. WEAVER & W. S. COLWELL.
PROCESS AND APPARATUS FOR MANUFACTURING SALT OR SUGAR.

No. 170,791. Patented Dec. 7, 1875.

Witnesses
James J. Johnston
Joseph F. Hewitt

Inventors
Jas. E. Weaver
W. S. Colwell

7 Sheets—Sheet 4.
J. E. WEAVER & W. S. COLWELL.
PROCESS AND APPARATUS FOR MANUFACTURING SALT OR SUGAR.
No. 170,791.  Patented Dec. 7, 1875.
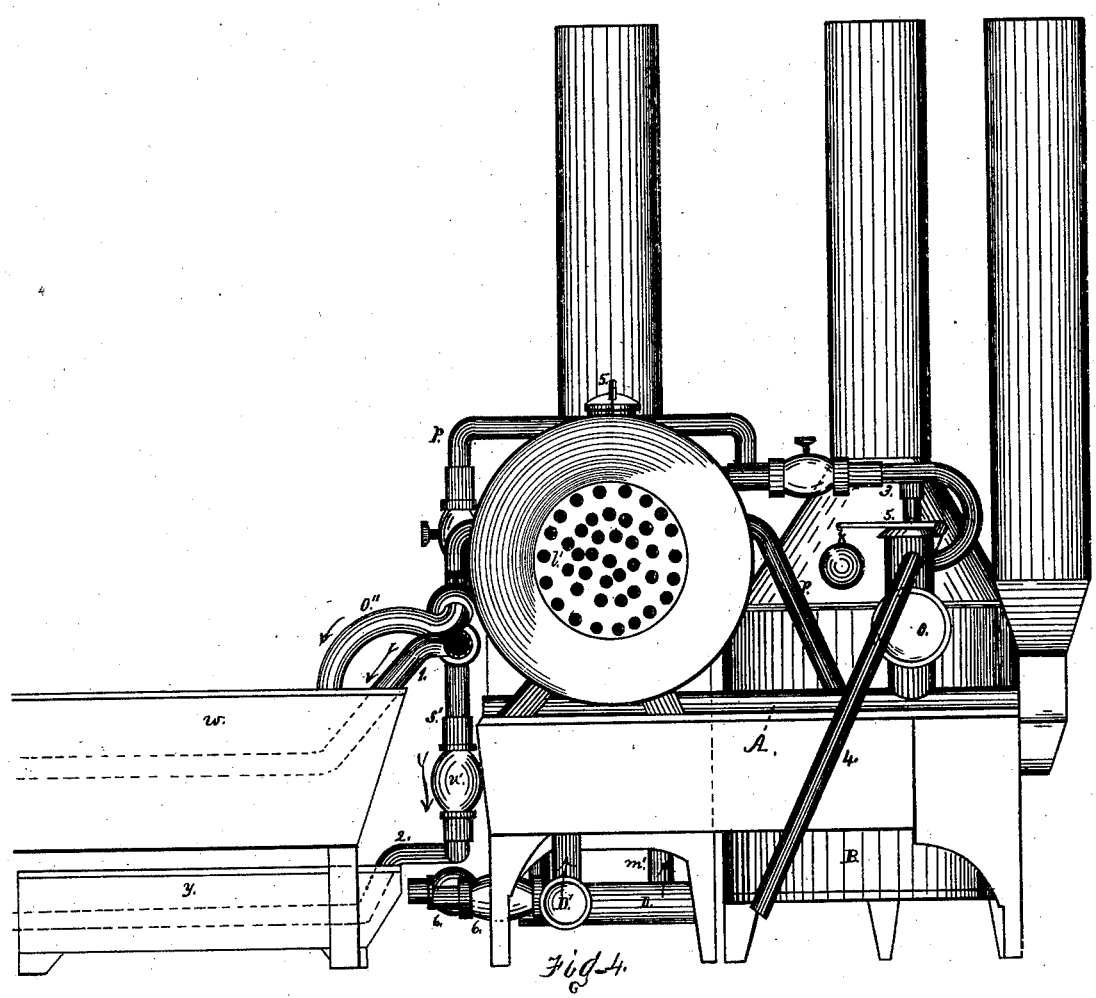

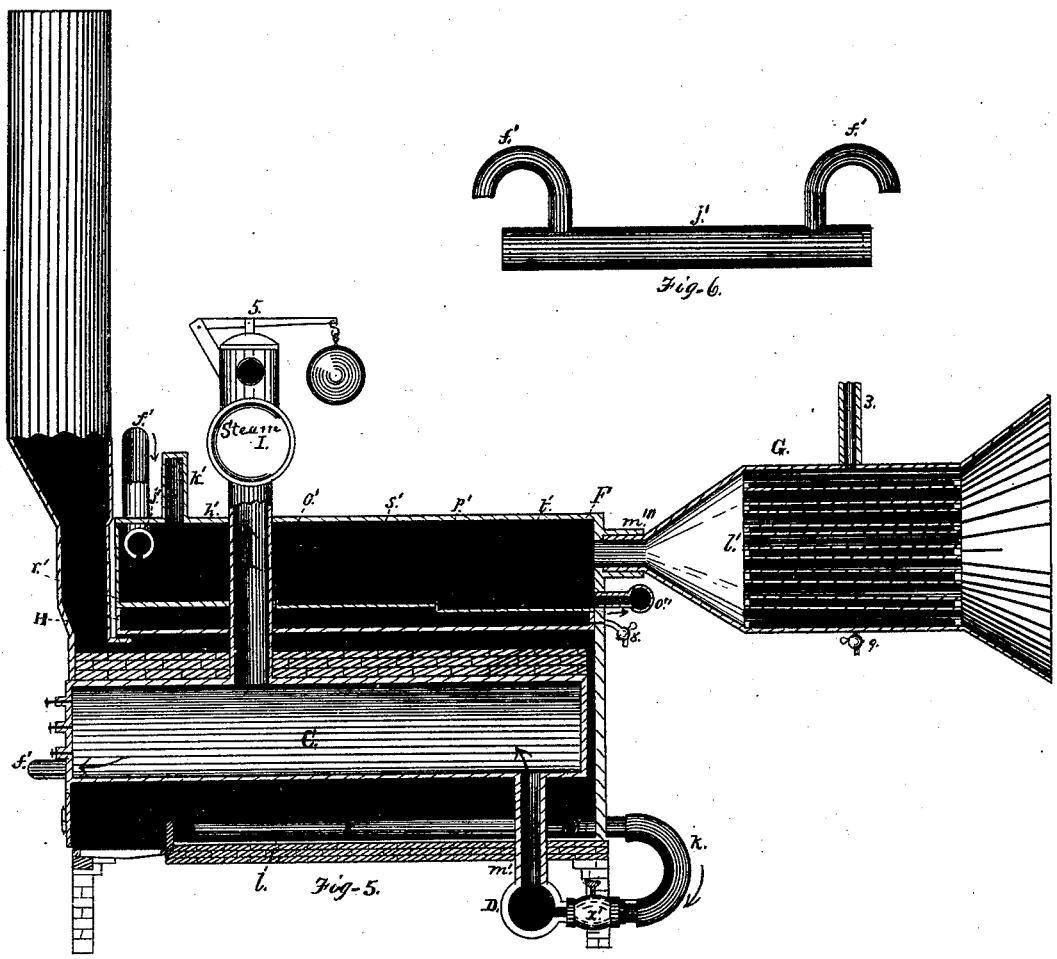

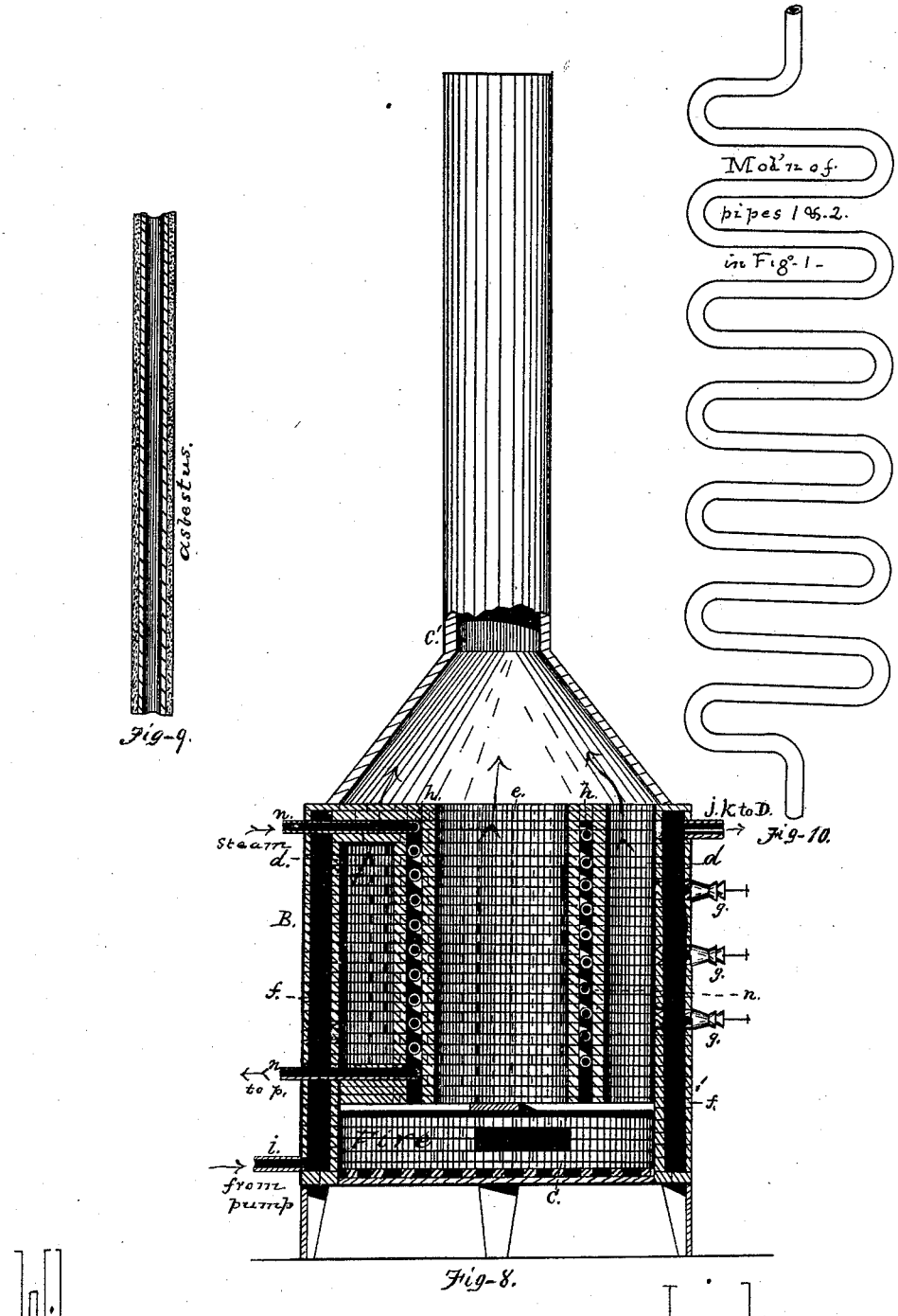

UNITED STATES PATENT OFFICE.

JAMES E. WEAVER AND WILLIAM S. COLWELL, OF PITTSBURG, PA.; SAID COLWELL ASSIGNOR TO SAID WEAVER.

IMPROVEMENT IN PROCESSES AND APPARATUS FOR MANUFACTURING SALT OR SUGAR.

Specification forming part of Letters Patent No. 170,791, dated December 7, 1875; application filed July 2, 1875.

*To all whom it may concern:*

Be it known that we, JAMES E. WEAVER and WILLIAM S. COLWELL, both of Pittsburg, in the county of Allegheny and State of Pennsylvania, have invented a new and useful Improvement in Process and Apparatus for Manufacturing Salt and Sugar; and we do hereby declare that the following is a full and exact description thereof, reference being had to the accompanying drawings, and to the letters of reference marked thereon.

Our invention relates to an improvement in process and apparatus for manufacturing salt or sugar; and consists in subjecting saline and saccharine liquors to heat, pressure, and a current of air through the medium of the apparatus hereinafter described.

To enable others skilled in the art with which our invention is most nearly connected to use our process and construct the apparatus connected therewith, we will proceed to describe the same more fully.

Figure 1:
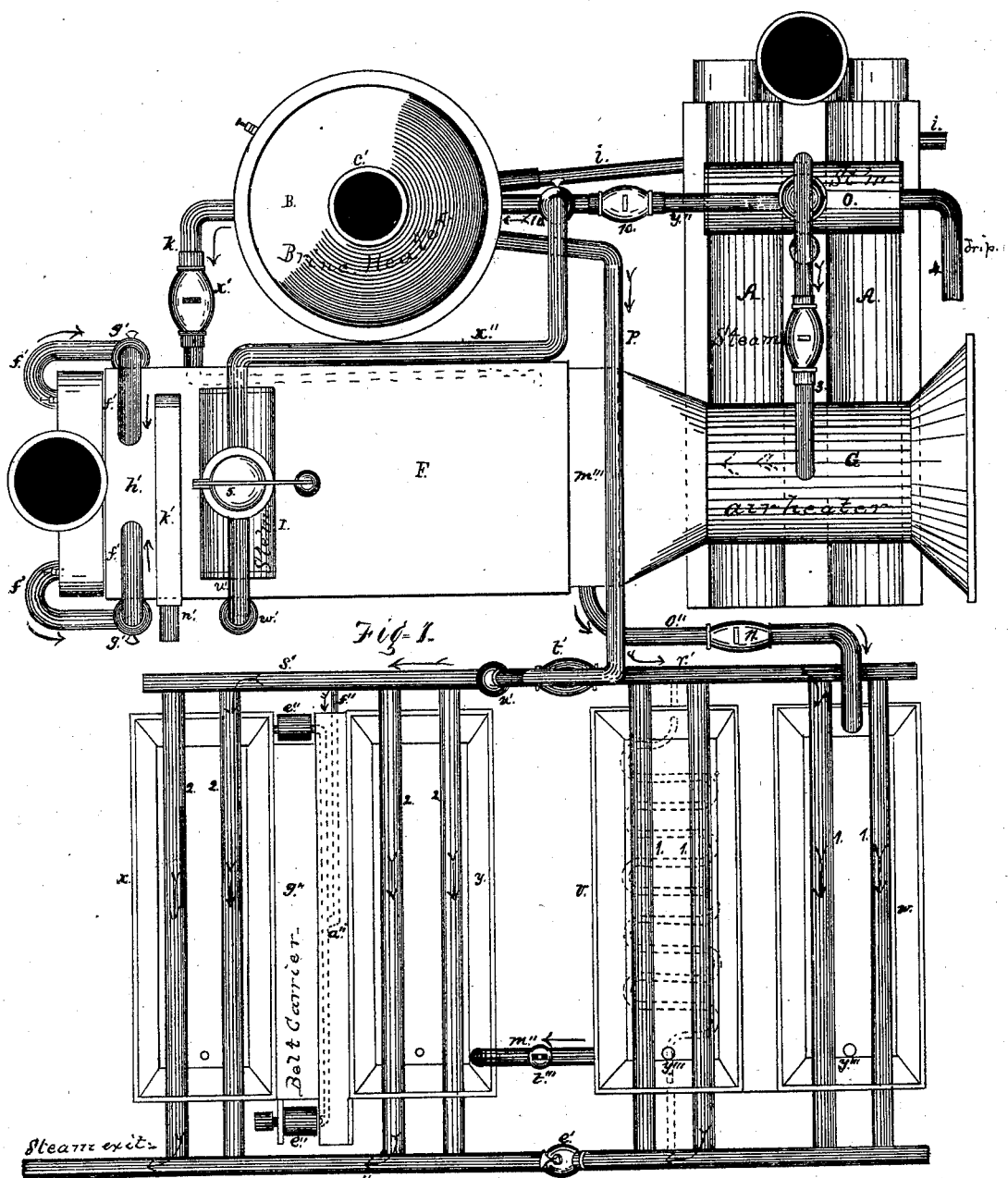
Figure 2:
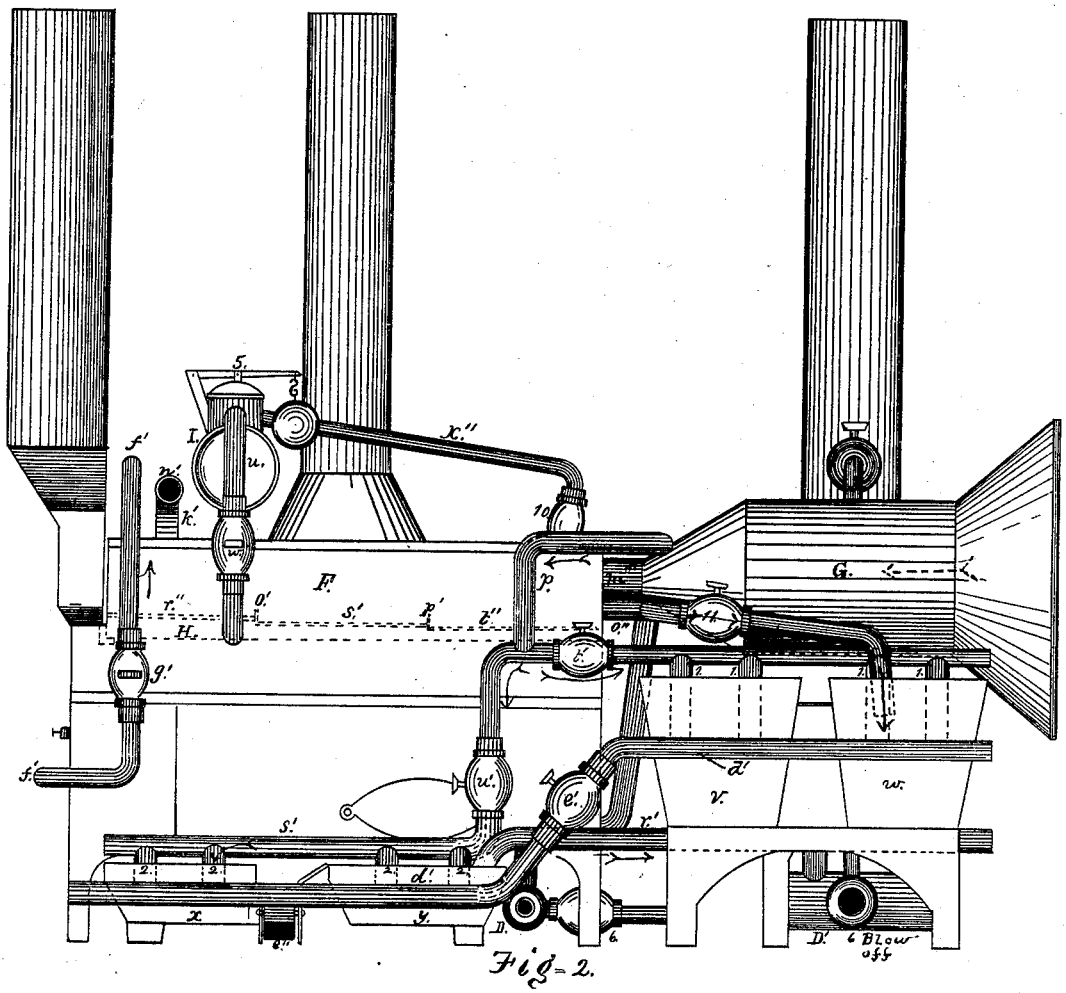
Figure 3:
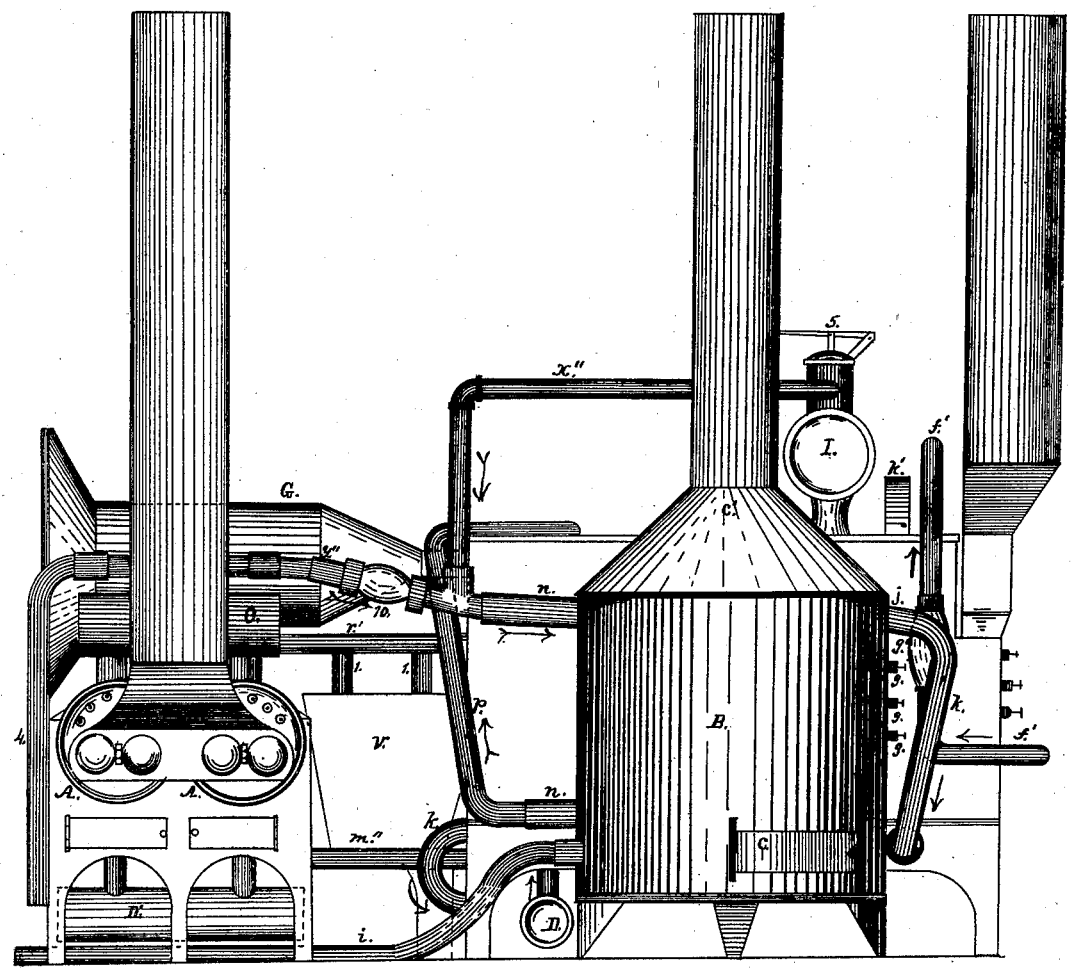
Figure 11:
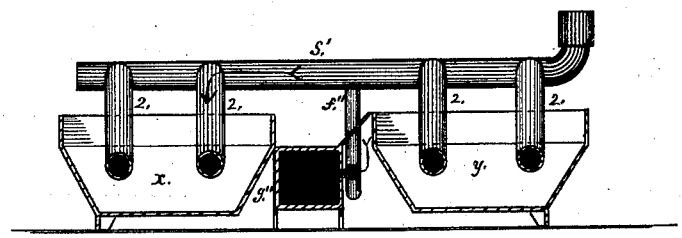
Figure 12:
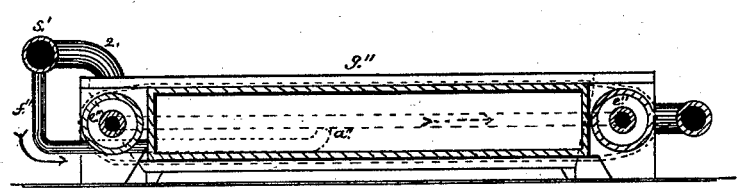

In the accompanying drawings, which form part of this specification, Figure 1 is a top view or plan of our improvement in apparatus for manufacturing salt and sugar. Figs. 2, 3, and 4 are side elevations of the same. Figs. 5 to 12, inclusive, are sections and detail views of the same.

The apparatus herein described is constructed of suitable sheet metal, such as iron, galvanized iron, or copper, or of a combination of said metals. The settling-vats and granulating-vats may be constructed of wood. The heater for the liquids and air, and all pipes exposed to the action of the atmosphere, should be wrapped so as to incase them in asbestus-cement felting, as indicated in Fig. 9.

In the accompanying drawings, A represents a pair of ordinary steam-boilers, which are used for the purpose of supplying the engines and steam-pumps which may be used in connection with the evaporating apparatus. B represents a heater, used for bringing the temperature of the saline or the saccharine liquids up to the boiling-point, and is also used for superheating steam. The heater B is provided with a fire-chamber, $c$, stack $c'$, heat-chambers $d\,e$, liquid-chamber $f$, furnished with gage-cocks, as indicated at $g$, and a chamber, $h$, for a spiral coil of pipe, $n$, used for superheating the steam. The walls of the chamber $h$ are constructed of fire-brick. The chamber $f$ is supplied with the saline or the saccharine liquid through the medium of the pipe $i$, which communicates with a pump or other supply device. To the chambers $f$, at $j$, is connected a pipe, $k$, which is furnished with a check-valve, $x'$. This pipe passes down into the fire-chamber $l$ of the boilers C, and, traversing said chamber, communicates with the drum D, which is connected to the under side of the boilers, through the medium of the branches $m'$. The upper end of the spiral pipe $n$ in the chamber $h$ is connected with the steam-drum $o$ of the steam-boilers A, and also with the steam-drum I of the steam-boilers C, through the medium of the branch pipes $y''$ and $x''$. To the lower end of the spiral pipe $n$ is attached a pipe, $p$, having branches $r'$ and $s'$, furnished with valves $t'$ and $u'$. To the branch $r'$ are connected pipes 1, running lengthwise in the settling-vats $v$ and $w$, and to the branch $s'$ are attached pipes 2, which run lengthwise of the granulating-vats $x$ and $y$.

The settling-vats $w$ and $v$ communicate, through openings $y'''$, with the pipe $m''$ furnished with a valve, $t'''$. The contents of the vats $v\,w$ may be, through the medium of pipe $m''$, transferred to the vats $x\,y$. The pipes 1 and 2 are arranged in the vats $v$, $w$, $x$, and $y$, near the bottom of the vats, and project through the outer end of the vats and are connected to a pipe, $d'$, which conducts off the results of condensation. The pipe $d'$ is provided with a valve, $e'$, whereby the communication between the pipes 1 and 2 may be cut off, so that the water resulting from condensation in the pipe 1 may be retained and allowed to flow into pipes 2, which is desirable in the process of making "coarse-grained salt," which requires a less degree of heat than is required for "fine-grain salt." The pipes 1 and 2 in the vats $v$, $w$, $x$, and $y$ may run zigzag, as indicated in Fig. 10. The pipe $d'$ may be furnished on its under side with a series of drain-cocks for carrying off the water formed by the condensation of the steam in pipes 1 and 2. To the front end of the boilers C are attached two pipes, $f'$, furnished with valves $g'$. The upper ends of the pipes $f'$ pass through the top $h'$ of the evaporating-chamber F, and are connected to a pipe, $j'$, which is furnished on its lower side with a large number of small apertures, as indicated in Fig. 7. The top $h'$ of the evaporating-chamber F is provided with a chamber, $k'$, to which is connected a suction-fan for drawing air first into the tubes $l'$ of the air-heater G, which is connected at its inner end to the evaporating-chamber F at $m'''$. The air, after being drawn into the tubes $l'$, passes from them through the evaporating-chamber F up into the chamber $k'$, and from it it is drawn off by means of a suction-fan connected to the chamber $k'$ at $n'$. The bottom of the evaporating-chamber F is divided into a series of liquid levels, each of which is on a different horizontal plane, and having transverse breast-walls, as indicated at $o'$ $p'$, (see Figs. 2 and 5,) so that the liquid flowing from the upper level $r''$ will pass in a thin sheet over the breast-wall $o'$, and in flowing from the level $s''$ to the level $t''$ will pass over the breast-wall $p'$ in a thin sheet, from which it flows through pipe $o''$ into the settling-vat $w$, the flow through pipe $o''$ being regulated by means of the valve 11. Between the bottom of the evaporating-chamber F and the upper side of the boilers C is a steam-chamber, H, into which steam flows from the drum I through the pipe $u'$. The steam in the chamber H is used for heating the bottom of the evaporating-chamber F and the liquid flowing over its bottom. The pipe $u'$, which connects the chamber H with the steam-drum I, is furnished with a valve, $w'$, for regulating the flow of steam into chamber H. The steam-drum I is is connected with the boilers C by pipes 7, which pass through the bottom of the evaporating-chamber F. To the steam-drum I is also connected a pipe, $x''$, which connects with a pipe, $y''$, leading from the steam-drum $o$ to the upper end of the spiral steam-pipe $n$ in chamber $h$. The pipes $x''$ and $y''$ should be furnished with valves, as at 10, for regulating the flow of steam to the spiral pipe $n$. The heater G is supplied with steam through the medium of a pipe, 3, connected to the steam-drum $o$, to which is also connected pipe 4 for supplying the engine or pump used in connection with the hereinbefore-described apparatus. The steam-drums I and $o$ are furnished each with a safety-valve, as indicated at 5. To the under side of the pipe $s'$ is connected a pipe, $f''$, represented by dotted lines $a''$, shown in Figs. 1, 11, and 12. This pipe communicates with the hollow drums $e''$, and a steam-chamber, $g''$, arranged between them and the granulating-vats.

The drums $e''$ and the top of the chamber $g''$ are used for carrying an endless apron, which is for the purpose of carrying the salt or sugar from the granulating-vats to the salt or sugar house, and in its passage the steam in the drums $e''$ and chambers $g''$ will dispel much of the moisture remaining in the salt or sugar by imparting a dry heat to the endless apron, which should be constructed of thin sheet-copper. The drums D and D' are furnished with blow-off valves, as indicated at 6. The chamber H and heater G are furnished with drain-cocks, as indicated at 8 and 9.

As the skilled mechanic will, from the foregoing description and by reference to the accompanying drawings, understand the construction and arrangement of the several parts of my improvement, I will therefore proceed to describe, briefly, the operation of the apparatus hereinbefore described.

The fire being made in the fire-chambers of the heater B and boilers A and C, the saline or saccharine liquid is forced into the chamber $f$ of the heater B, the pressure of steam in the boilers being the pressure of liquid in chamber $f$ of the heater B, for it will be observed that the action of the pump, which forces the liquid into the chamber $f$ through pipe $i$, must lift, at each stroke of the pump-plunger, the check-valve $x'$ of the pipe $k$, which communicates with the boiler C through the medium of the drum D and its branches $m'$. The saline or saccharine liquid, after leaving the chamber $f$ of the heater B, is heated to a greater degree in its passage through pipe $k$, so that, as soon as the liquid enters the boilers C, it begins to increase in its specific gravity. The liquid in the boilers C should not be allowed to rise more than two-thirds of the vertical depth of the boiler, the remaining one-third being for steam-room. The pressure of steam in the boilers C forces the liquid up through pipes $f'$ into the pipe $j'$ in the evaporating-chamber F, from which pipe it flows, in fine streams, down on the level $r''$, and, flowing along on it, passes, in a thin sheet, over the breast-wall $o'$ to level $s''$, and, flowing along on it, passes over the breast-wall $p'$, in a thin sheet, to level $t''$, from which it flows, through pipe $o''$, into the settling-vat $w$, and from it, through pipe $m''$, into the settling-vat $v$ through opening $y'''$ in its bottom; and after the liquid has settled sufficiently it is drawn off, through pipe $m''$, into the granulating-vats $y$ and $x$, where it is treated and manipulated in the usual manner. After the process of granulation is completed in vats $y$ and $x$—the salt or sugar, as the case may be—it is thrown upon the carrying-apron, which travels over the drums $e''$ and heating-chamber $g''$ to the salt or sugar depositing house. The saline or saccharine liquid, in its passage through the evaporating-chamber F, is subjected to a strong current of heated air, which is heated in its passage through tubes $l'$ of the heater G.

The spiral pipe $n$ in the heater B is used for superheating the steam used in the pipes 1 and 2 in the vats $w$, $v$, $x$, and $y$.

The flow of steam and liquids through the various pipes is controlled by the several valves connected therewith, and will be readily understood by those skilled in the art of making salt and sugar.

The advantages of our process, as hereinbefore described, consists in evaporating saline and saccharine liquids with great rapidity, with economy of fuel and heat, and perfect utilization of the latter.

Having thus described our improvement, what we claim as of our invention is—

1. The process of manufacturing salt or sugar, herein described—that is, heating the saline or saccharine liquor under pressure in a close chamber, and thence forcing it into an evaporating-boiler, from whence it is distributed in thin sheets and a current of air passed over it, substantially as hereinbefore described and set forth.

2. The combination of the heater B, steam boiler or boilers A, boiler or boilers C, air-heater G, and evaporating-chamber F, substantially as herein described, and for the purpose set forth.

3. The combination of the boilers C, pipes $f'$, distributing-pipe $j'$, evaporating-chamber F, and air-heater G, substantially as herein described, and for the purpose set forth.

4. The combination of the heater B, pipe $k$, and boiler or boilers C, substantially as herein described, and for the purposes set forth.

5. The combination of the pipes $n\ r'\ p\ s'\ 1\ 2\ d'$ and vats $v, w, x$, and $y$, substantially as herein described, and for the purpose set forth.

6. The combination of the hollow drums $e''$ and steam-chambers $g''$ with the vats $x\ y$, substantially as herein described, and for the purpose set forth.

JAS. E. WEAVER.
W. S. COLWELL.

Witnesses:
JAMES J. JOHNSTON,
JOSEPH F. HEWITT.